United States Patent
Russell et al.

(10) Patent No.: US 9,078,234 B2
(45) Date of Patent: Jul. 7, 2015

(54) MOBILE VOICE OVER INTERNET PROTOCOL OPERATION

(75) Inventors: Nick Russell, Newbury (GB); Christopher David Pudney, Newbury (GB); Gavin Wong, Newbury (GB)

(73) Assignee: Vodaphone IP Licensing Limited, Newbury, Berkshire (GB)

( * ) Notice: Subject to any disclaimer, the term of this patent is extended or adjusted under 35 U.S.C. 154(b) by 683 days.

(21) Appl. No.: 12/927,502

(22) Filed: Nov. 16, 2010

(65) Prior Publication Data
US 2011/0122817 A1 May 26, 2011

(30) Foreign Application Priority Data
Nov. 16, 2009 (GB) .................................. 0919996.9

(51) Int. Cl.
*H04W 60/04* (2009.01)
*H04W 8/02* (2009.01)
*H04W 48/18* (2009.01)
*H04W 48/20* (2009.01)

(52) U.S. Cl.
CPC ................ *H04W 60/04* (2013.01); *H04W 8/02* (2013.01); *H04W 48/18* (2013.01); *H04W 48/20* (2013.01)

(58) Field of Classification Search
CPC ..... H04W 48/18; H04W 48/20; H04W 60/04; H04W 8/02
USPC ........................................................ 370/328
See application file for complete search history.

(56) References Cited

U.S. PATENT DOCUMENTS

| 2002/0049059 | A1* | 4/2002 | Soininen et al. ............. 455/439 |
| 2007/0174443 | A1* | 7/2007 | Shaheen et al. ............. 709/223 |
| 2009/0129342 | A1* | 5/2009 | Hwang et al. ................. 370/331 |
| 2010/0056146 | A1* | 3/2010 | Guo et al. .................. 455/435.2 |
| 2010/0296421 | A1* | 11/2010 | Watfa et al. .................... 370/310 |
| 2012/0106324 | A1* | 5/2012 | Keller et al. .................. 370/225 |

OTHER PUBLICATIONS

Deutsche Telekom: "Selective ISR disabling", 3GPP TSG SA WG2 Meeting #76; TD S2-096692, 3rdGeneration Partnership Project (3GPP), Mobile Competence Centre; 650, Route Des Lucioles; F-06921 Sophia-Antipolis Cedex, France; No. Cabo: 20091116, Nov. 10, 2009, XP050397614.
Vodafone: "Comments on Deutsche Telekom paper in S2-096692", 3GPP TSG SA WG2 Meeting #76; TD S2-097188; Nov. 16, 2009, pp. 1-4, XP002622068, San Jose Del Cabo, Mexico; Retrieved from the Internet: URL: http://www.3gpp.org/ftp/tsg_sa/WG2_Arch/TSGS2_76_Cabo/Docs/.

(Continued)

*Primary Examiner* — Huy D Vu
*Assistant Examiner* — Stephen J Clawson
(74) *Attorney, Agent, or Firm* — Knobbe, Martens, Olson & Bear LLP

(57) ABSTRACT

A mobile station is operated within at least one radio network having a plurality of base stations. Only some of the plurality of base stations support a Voice over Internet Protocol, VoIP, service. The mobile station is registered with a first base station of the plurality of base stations. The mobile station may be registered with a second base station. The mobile station determines that one of the first base station and the second base station has functionality to support VoIP and the other does not. A Routing Area Update Request message or Tracking Area Update Request message is sent from the mobile station to the second base station in response to determining support for VoIP.

14 Claims, 4 Drawing Sheets

(56) References Cited

OTHER PUBLICATIONS

Vodafone: "Comments and analysis on the proposal to disable ISR for selected UEs", 3GPP TSG SA WG2 Meeting #77; TD S2-100662, Jan. 18-22, 2010, pp. 1-5, XP002622069, Shenzhen, China; Retrieved from the Internet: URL: http://www.3gpp.org/ftp/tsg_sa/WG2_Arch/TSGS2_77_Shenzhen/docs/.

Nokia Siemens Networks, et al: "Introduction of Voice over IMS session support indication", 3GPP TSG CT WG1 Meeting #59, C1-092867-VOIMS-24301-821, $3^{rd}$ Generation Partnership Project (3GPP), Mobile Competence Centre, 650, Route Des Lucioles, F-06921 Sophia-Antipolis Cedex, France, no. Los Angeles; Jul. 1, 2009, XP050349636.

ETSI TS 123 401 V9.2.0 (Oct. 2009), Technical Specification, LTE; General Packet Radio Service (GPRS) enhancements for Evolved Universal Terrestrial Radio Access Network (E-UTRAN) access (3GPP TS 23.401 version 9.2.0 Release 9), 247 pp.

\* cited by examiner

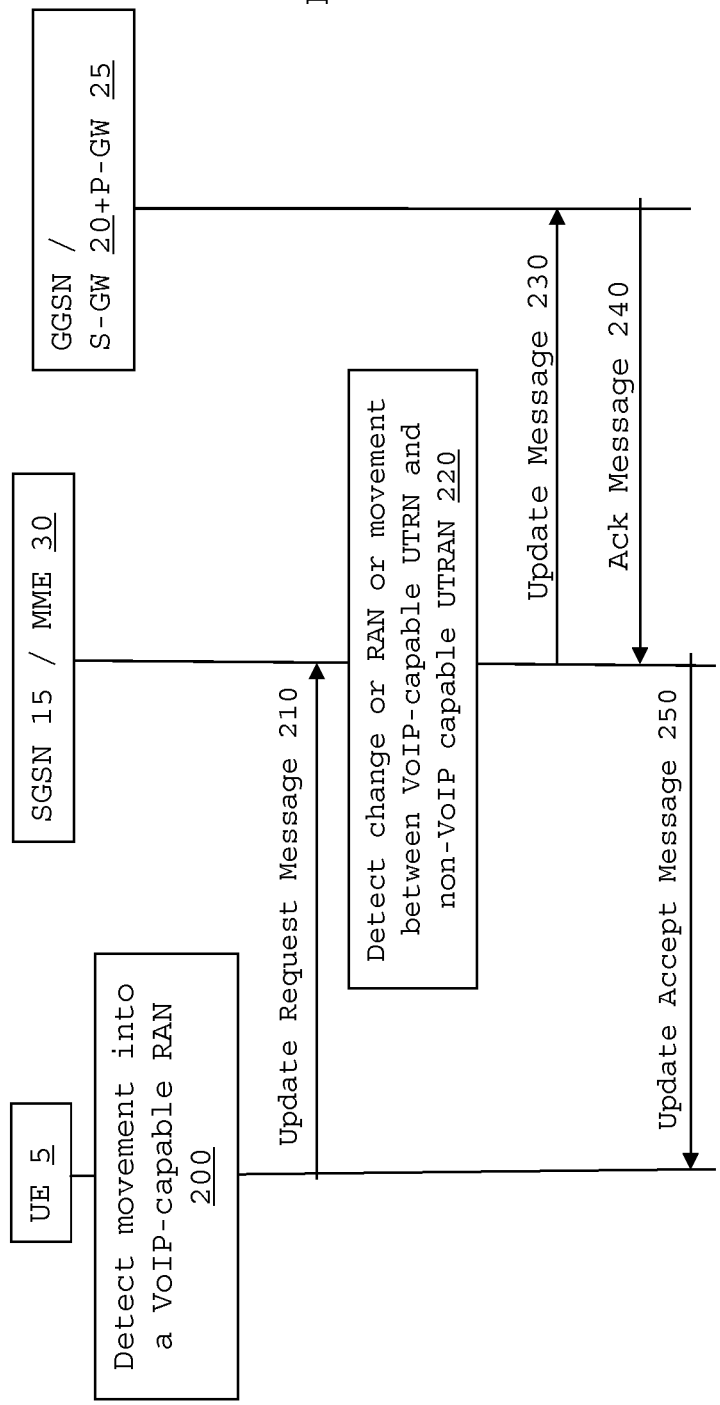

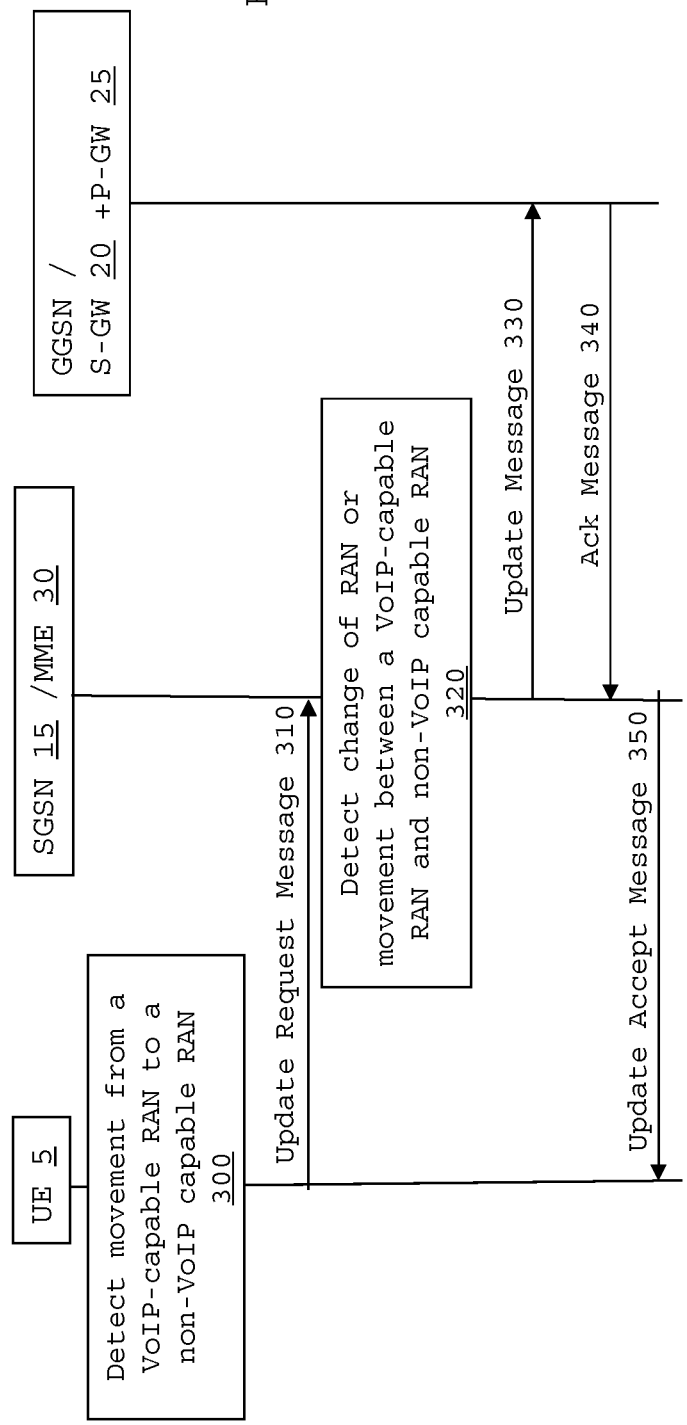

MOBILE VOICE OVER INTERNET PROTOCOL OPERATION

TECHNICAL FIELD

The system described herein relates to a method of operating a mobile station within at least one radio network, a method of operating such a radio network and a mobile station configured for operation in at least one radio network. In particular, the at least one radio network may comprise a system using the 3GPP long term evolution (LTE) radio access technology.

BACKGROUND

The third generation partnership project (3GPP) has developed standards for a cellular communication system, referred to as long term evolution (LTE). LTE uses a radio access network (RAN) that is different from the RAN used in GSM and UMTS networks. Mobile stations, which are usually termed user equipment (UE) can operate both with the GSM EDGE RAN (GERAN) and the UMTS Terrestrial RAN (UTRAN).

Users demand voice connections to be provided over the RAN. LTE, unlike GSM and UMTS, does not support Circuit Switched (CS) technology, which has conventionally been used for voice connections. It is expected that an IP Multimedia Subsystem (IMS) will be used for voice connections in LTE. Consequently, a UE will be able to make voice connections using CS technology over GSM or UMTS networks or use Packet Switched (PS) access, for example using Voice over Internet Protocol, VoIP, over LTE.

Whilst existing GSM systems have PS functionality, the GERAN does not support the necessary bandwidth and quality of service (QoS) features required for VoIP. A UMTS system can also provide packet switched services, but some systems may not provide the necessary bandwidth and the QoS features required for VoIP. For example, this may depend on whether specialist bandwidth control equipment is employed in the UTRAN.

An existing IMS cannot determine whether to deliver a mobile terminating call over PS access or via CS technology, without incurring some extra call setup delay. Additionally or alternatively, extra functionality may be required in the mobile switching centre (MSC) in the currently serving or visited network, for example an IMS centralised services functionality. Reducing this call setup delay is difficult without affecting other parts of the network.

One option is for the IMS to try delivering the voice connection over PS and, in the case of failure, revert to CS provision over GERAN or UTRAN if the UE can access these networks. However, this adds delay to mobile terminating call setup times. Moreover, such connections need to be made within a predefined time period and this additional delay could cause a time-out at the originating end, leading to the call being dropped at the worst case.

An alternative solution is for the UE to keep the core network continually informed with current VoIP capability. However, this leads to increased signalling, which is undesirable and GSM, UTRAN and LTE already include functionality to reduce signalling. For instance, base stations (equivalently Node B in UMTS or eNodeB in LTE) are grouped together in Routing Areas. The UE does not inform the core network of a UMTS system when it moves between access via GERAN and UTRAN, if these two RANs both share the same Routing Areas. Similarly, the UE does not inform the core network of an LTE system when it changes between LTE and GERAN or UTRAN if the UE and the currently serving or visited network have instructed the UE to use the "Idle mode Signally Reduction" (ISR) feature, which is defined in more detail in 3GPP TS 23.401. Network operators find ISR a desirable technology, since its use improves network efficiency.

Providing the IMS with the information necessary to optimally route voice connections without a significant reduction in efficiency is a challenge.

SUMMARY

Against this background, the system described herein provides a method of operating a mobile station within at least one radio network comprising a plurality of base stations, only some of the plurality of base stations having functionality to support a Voice over Internet Protocol, VoIP, service the method comprising: registering the mobile station with a first base station from the plurality of base stations; deciding to register the mobile station with a second base station; determining at the mobile station that one of the first base station and the second base station has functionality to support VoIP and the other does not; and sending a Routing Area Update Request message or Tracking Area Update Request message from the mobile station to the second base station in response to said determination regarding functionality to support VoIP.

In this approach, ISR remains functioning, but is ignored or deactivated only when the UE moves from a base station having VoIP functionality to one that does not or vice versa. Once the routing area update or tracking area update is complete in this case, the ISR remains functioning and no unnecessary signalling is employed. Moreover, the ISR also remains functioning when the UE moves between base stations, but there is no change in the VoIP functionality between the base stations. In this way, the IMS is informed about the ability of the UE to receive voice connections over CS or PS technology, without significantly increasing the signalling burden on the RAN. Most preferably, the mobile station ends its registration with the first base station before or soon after registering with the second base station.

Preferably, the method further comprises activating Idle mode Signalling Reduction, ISR, functionality at the mobile station following the step of registering the mobile station with the first base station, such that the mobile station is configured to send a Routing Area Update Request message or a Tracking Area Update Request message to any one of the plurality of base stations only under a set of predetermined conditions.

Disabling ISR completely for some UE devices or subscribers is not desirable. Such an approach increases unnecessary signalling between the UE and the serving core network, as well as between the serving core network and the home core network. This contradicts the philosophy of ISR and may negate its benefits.

In an embodiment, the set of predetermined conditions is independent of the functionality of any of the plurality of base stations to support VoIP. For example, the set of predetermined conditions may include: the first base station and the second base station are in different routing areas. In these embodiments, the method may further comprise deactivating the ISR functionality at the mobile station in response to said determination regarding functionality to support VoIP. This may also be considered ignoring the ISR functionality, since a routing area update or tracking area update request message is sent even though ISR remains functioning.

In some embodiments, the step of determining regarding functionality to support VoIP comprises receiving a communication at the mobile station from a Device Management server. Alternatively, the step of determining regarding functionality to support VoIP comprises: sending a Routing Area Update Request message or Tracking Area Update Request message to the first base station; and receiving a Routing Area Update Accept message or Tracking Area Update Accept message from the first base station, indicating that one of the first base station and the second base station has functionality to support VoIP and the other does not. The Routing Area Update Request message or Tracking Area Update Request is sent and the Routing Area Update Accept message or Tracking Area Update Accept is beneficially received as part of the registration step with the first base station.

The method may optionally further include registering the mobile station with a third base station from the plurality of base stations. Most preferably, the mobile station ends its registration with the first base station before or soon after registering with the third base station. This step can, in embodiments, occur after the step of registering the mobile station with the first base station and before the step of deciding to register the mobile station with a second base station. The first base station and the third base station may both have the functionality to support VoIP or neither the first base station nor the third base station may have the functionality to support VoIP in such embodiments.

Advantageously, the first base station is a part of a first radio network having a first radio access technology and the second base station is a part of a second radio network having a second, different radio access technology. The first radio access technology and the second radio access technology may each include one or more of: time division multiple access (TDMA); frequency division multiple access (FDMA); code division multiple access (CDMA); and orthogonal frequency division multiplexing (OFDM).

In an embodiment, the mobile station is registered with an IP Multimedia Subsystem, IMS, for voice and the first base station or second base station is part of a Registration Area that supports VoIP using an IMS voice over PS session.

In a second aspect, there is provided a method of operating a radio network, comprising the method of operating a mobile station as described herein, the method further comprising: receiving the Routing Area Update Request message or Tracking Area Update Request message sent by the mobile station at a Serving GPRS Support Node, SGSN, or Mobility Management Entity, MME, of the radio network; communicating from the SGSN or MME to a Gateway GPRS Support Node, GGSN, or Serving-Gateway, S-GW and Packet Data Network-Gateway, P-GW, a message to update the Packet Data Protocol, PDP, context in response to the received Routing Area Update Request message or Tracking Area Update Request message; communicating an acknowledgment message from the GGSN or S-GW and P-GW to the SGSN or MME in response to the message to update the PDP context; and communicating a Routing Area Update Accept message or Tracking Area Update Accept message from the SGSN or MME to the mobile station.

In a third aspect, there is provided a computer program operable to carry out the method described herein.

There is provided in a fourth aspect a mobile station configured for operation in at least one radio network comprising a plurality of base stations, only some of the plurality of base stations having functionality to support a Voice over Internet Protocol, VoIP, service, the mobile station comprising: a transceiver arranged to communicate with the at least one radio network; and a processor configured to control the transceiver to register the mobile station with a first base station from the plurality of base stations, to decide to register the mobile station with a second base station, to determine that one of the first base station and the second base station has functionality to support VoIP and the other does not and to control the transceiver to send a Routing Area Update Request message or Tracking Area Update Request message to the second base station in response to said determination regarding functionality to support VoIP.

In the preferred embodiment, the processor is further configured to activate Idle mode Signalling Reduction, ISR, functionality following registration with the first base station, such that a Routing Area Update Request message or a Tracking Area Update Request message is sent by the transceiver to any one of the plurality of base stations only under a set of predetermined conditions.

Optionally, the set of predetermined conditions is independent of the functionality of any of the plurality of base stations to support VoIP, the processor being further configured to deactivate the ISR functionality in response to said determination regarding functionality to support VoIP.

In one embodiment, the processor is configured to make a determination regarding functionality to support VoIP by controlling the transceiver to receive a communication from a Device Management server. Alternatively, the processor is configured to make a determination regarding functionality to support VoIP by: controlling the transceiver to send a Routing Area Update Request message or Tracking Area Update Request message to the first base station; and controlling the transceiver to receive a Routing Area Update Accept message or Tracking Area Update Accept message from the first base station, indicating that one of the first base station and the second base station has functionality to support VoIP and the other does not.

Advantageously, the transceiver is configured to operate with a plurality of radio networks, each radio network have a respective radio access technology.

In an embodiment, the processor is further configured to register the mobile station with an IP Multimedia Subsystem, IMS, for voice and wherein the mobile station is further configured to communicate with a base station that is part of a Registration Area that supports VoIP using an IMS voice over PS session.

BRIEF DESCRIPTION OF THE DRAWINGS

The system described herein may be put into practice in various ways, a number of which will now be described by way of example only and with reference to the accompanying drawings in which:

FIG. 4 shows an exemplary flow of information between nodes in a network when the UE moves from a VoIP incapable RAN to a VoIP capable RAN according to the system described herein; and FIG. 5 shows an exemplary flow of information between nodes in a network when a UE moves from a VoIP capable RAN to a VoIP incapable RAN according to the system described herein.

DETAILED DESCRIPTION OF VARIOUS EMBODIMENTS

Figure 1:
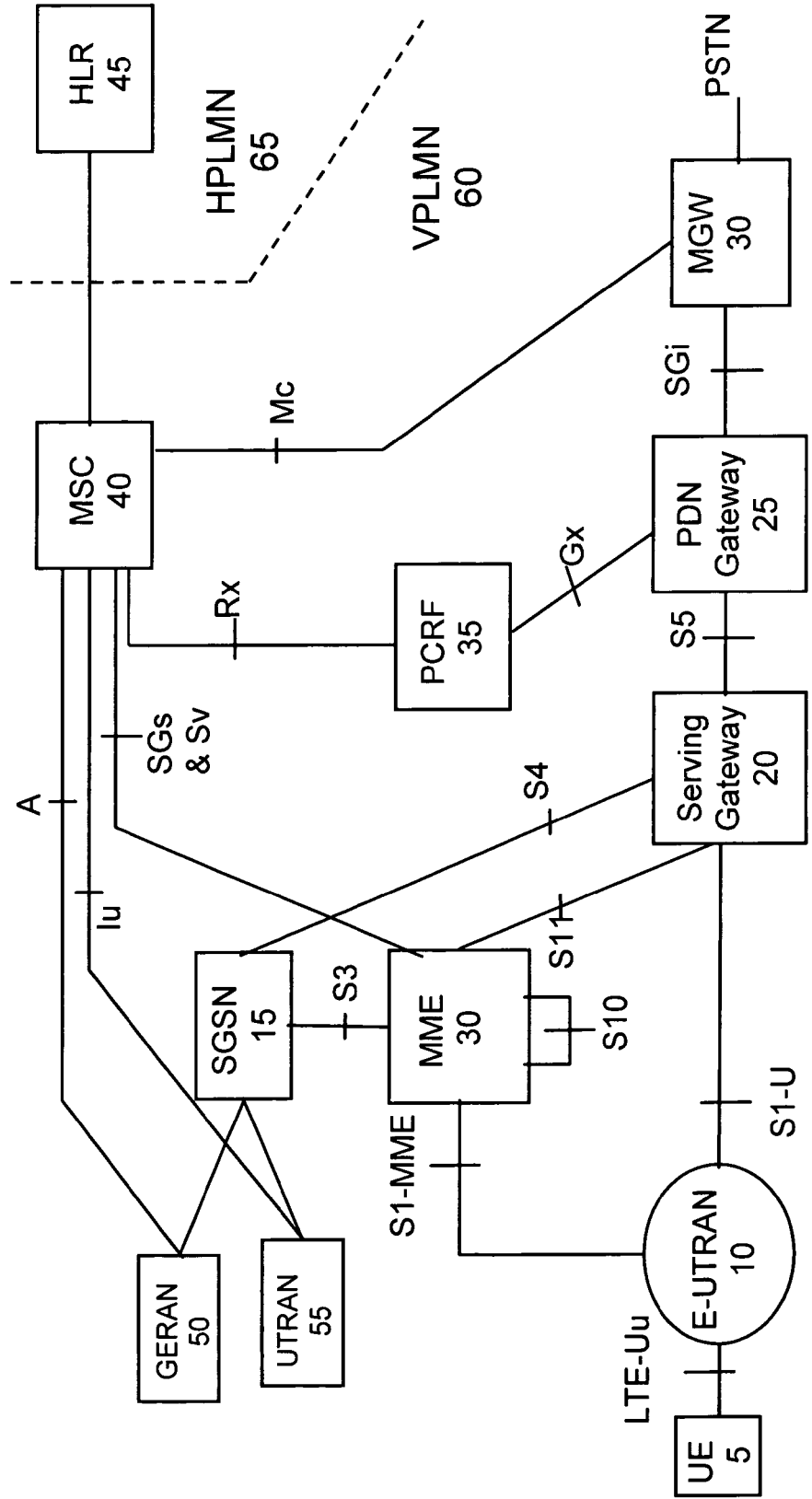
FIG. 1 shows an illustration of a mobile network architecture.

Referring now to FIG. 1, there is shown an illustration of a mobile network architecture in accordance with the system described herein.

The mobile network architecture comprises: a user equipment (UE) 5; an evolved universal terrestrial radio access network (E-UTRAN) 10; a mobility management entity (MME) 30; a serving GPRS support node (SGSN) 15; a serving gateway (S-GW) 20; a packet data network (PDN) gateway (P-GW) 25; a media gateway (MGW) 30; a policy and charging rules function (PCRF) 35; a mobile switching centre (MSC) 40; a home location register (HLR) 45; a GSM-EDGE radio access network (GERAN) 50; and a UMTS terrestrial radio access network (UTRAN) 55. Interfaces between these network components are also labelled. For roaming purposes, the visitor public land mobile network (VPLMN) 60 and home public land mobile network (HPLMN) 65 are also indicated. The MSC 40 may be a Mobile Switching Centre Server (MSC-S).

The P-GW 25 may be located in the HPLMN 65. In a roaming situation, a Gateway GPRS Support Node (GGSN, not shown) and P-GW 25 for any given PDP Context can be in the VPLMN 60 or the HPLMN 65. In order to offer a reasonable QoS for voice connections though, it is generally accepted that a GGSN or P-GW 25 is desirably always be in the VPLMN 60. Some operators may utilise a GGSN or P-GW 25 in the HPLMN 65.

Although the term base station is used below, the skilled person will appreciate that it is to be understood in a generic sense and not limited to a particular network or RAN. In particular, the base station can include the Node B of a UTRAN 55 or eNodeB of an E-UTRAN 10 or BTS/BSS of a GERAN 50.

When the UE 5 first registers with the E-UTRAN 10 and first registers with either the UTRAN 55 or GERAN 50, ISR may be enabled. In this case, further routing area updates or tracking area updates to the same areas as previously registered are not sent, according to the conventional criteria. ISR reduces the signalling burden on the UE, RAN, and signalling links between VPLMN and HPLMN, thus increasing network efficiency.

When the UE 5 determines that it is moving from a base station that has VoIP capability to a base station that does not have VoIP capability or vice versa, ISR is not disabled by the UE 5. Instead, the UE ignores (or temporarily deactivates) ISR and the common GERAN 50 or UTRAN 55 routing area functionality.

When the UE 5 moves between a VoIP supporting RAN and another VoIP supporting RAN, ISR remains activated and no specific routing area update or tracking area update is performed for this operation. The same also applies when the UE moves between a non-VoIP supporting RAN and another non-VoIP supporting RAN. A routing area update or tracking area update can occur, however, for other reasons, as detailed in 3GPP TS 23.401. The UE 5 can determine whether or not the local E-UTRAN 10 or UTRAN 55 supports VoIP by analysing the existing signalling information provided to it at routing area update and tracking area update. If a VoIP capability indication flag is set, for example the "IMS voice over PS session in S1 mode supported" flag, this will provide the UE 5 with an indication that the base station supports VoIP.

Referring next to FIG. 4, there is shown an exemplary flow of information between nodes in the network when the UE 5 leaves a VoIP incapable RAN and moves to a VoIP capable RAN. This flow of information occurs in the following scenarios: the UE 5 was served by a GERAN 50 and is now in a UTRAN 55 with VoIP capability, when the GERAN 50 and UTRAN 55 are part of a combined Routing Area; when the UE 5 was served by a GERAN 50 and is moved to a UTRAN 55 with VoIP capability, the GERAN 50 and UTRAN 55 being part of separate Routing Areas; the UE 5 was served by a UTRAN 55 without VoIP capability and moves to a UTRAN 55 with VoIP capability; the UE 5 was served by a GERAN 50 and moves to an E-UTRAN 10 with VoIP capability; the UE 5 was served by a UTRAN 55 without VoIP capability and moves to an E-UTRAN 10 with VoIP capability; the UE 5 was served by an E-UTRAN 10 without VoIP capability and moves to a UTRAN 55 with VoIP capability; and the UE 5 was served by an E-UTRAN 10 without VoIP capability and moves to an E-UTRAN 10 with VoIP capability.

In a first step 200, the UE 5 detects movement into a VoIP-capable RAN. As a consequence, the UE 5 transmits a tracking area update or routing area update request message 210. This is received by the SGSN 15 or the MME 30. In detection step 220, the SGSN 15 or MME 30 detects the change of RAN, or the SGSN 15 detects movement between a VoIP-capable UTRAN and a non-VoIP capable UTRAN. The SGSN 15 or MME 30 may preferably transmit a PDP context update message 230 to the GGSN (not shown in FIG. 1) or the serving gateway 20 and PDN gateway 25. The context update message 230 updates the Packet Data Protocol (PDP) context to reflect the new radio access technology type. The GGSN or serving gateway 20 and PDN gateway 25 then transmits an acknowledgement message 240. This is received by the SGSN 15 or the MME 30. In response to the UE 5, the SGSN 15 or MME 30 transmits a tracking area update or routing area update accept message 250 to the UE 5.

Referring now to FIG. 5, there is shown an exemplary flow of information between nodes in the network when a UE 5 leaves a VoIP capable RAN and moves to a VoIP-incapable RAN. This flow of information occurs in the following scenarios: the UE 5 was served by a UTRAN with VoIP capability and moves to a GERAN 50; the UE 5 was served by a UTRAN with VoIP capability and moves to a UTRAN without VoIP capability; the UE was served by an E-UTRAN 10 with VoIP capability and moves to a GERAN 50; the UE 5 was served by a E-UTRAN 10 with VoIP capability and moves to a UTRAN without VoIP capability; the UE 5 was served by a UTRAN 55 with VoIP capability and moves to an E-UTRAN 10 without VoIP capability; and the UE 5 was served by an E-UTRAN 10 with VoIP capability and moves to an E-UTRAN without VoIP capability.

In a first step 300, the UE 5 detects movement from a VoIP-capable RAN to a non-VoIP capable RAN. The UE 5 then transmits a first message 310, which is a tracking area update or routing area update request message. This is received by the SGSN 15 or the MME 30. In detection step 320, the SGSN 15 or MME 30 detects the change of RAN or movement between a VoIP-capable RAN and non-VoIP capable RAN. As a consequence, the SGSN 15 or MME 30 preferably may transmit a PDP update context message 330 to the GGSN or the serving gateway 20 and PDN gateway 25. The GGSN or serving gateway 20 and PDN gateway 25 transmits an acknowledgement message 340 to SGSN 15 or MME 30. The SGSN 15 or MME 30 then transmits a tracking area update or routing area update accept message 350 to the UE 5.

Figure 2:
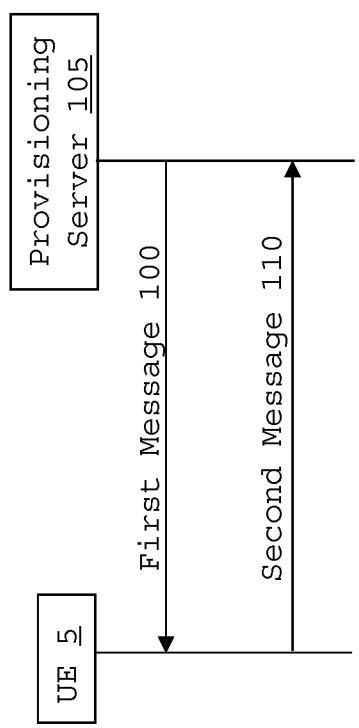
FIG. 2 shows a schematic illustration of the flow of information between nodes in a network according to one embodiment of the system described herein.

The deactivation or ignoring of ISR can be effected in a number of different ways, two of which will now be described. Referring to FIG. 2, there is shown a flow of information between a UE 5 and a provisioning server 105 according to a first embodiment of the system described herein. A device management system can be used to control the implementation of ISR at the UE 5. Such a device management system may comprise a provisioning server 105, for example as used in the open mobile alliances (OMA) device management (DM) feature.

In this implementation, the provisioning server 105 sends a first message 100 to the UE 5. This first message 100 either enables or disables the reporting of VoIP capability by the UE 5. The UE 5 then sends a second message 110 to the provisioning server 105. This second message 110 is simply an acknowledgement.

Figure 3:
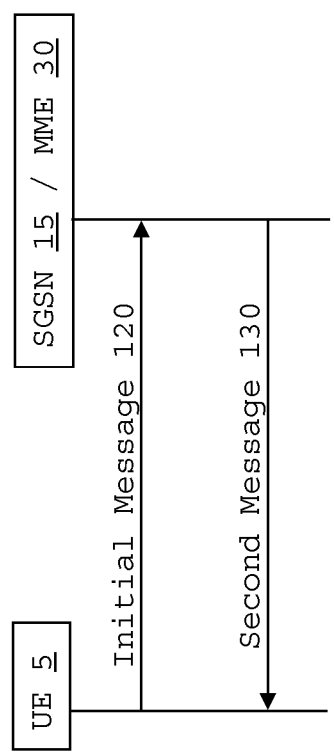
FIG. 3 shows an exemplary flow of information between nodes in a network according to a second embodiment of the system described herein.

Referring next to FIG. 3, there is shown an exemplary flow of information between nodes in a network according to a second embodiment. Firstly, initial message 120 is transmitted from the UE to the SGSN 15 or MME 30. This initial message 120 is a routing area update request or tracking area update request. Then, the SGSN 15 or MME 30 transmits a second message 130 to the UE. This second message 130 is a routing area update accept or tracking area update accept message and contains a flag which indicates whether VoIP is supported by the RAN. Based on this flow of information, reporting by the UE of RAN capability with regard to VoIP is enabled or disabled only when the capability in respect of VoIP changes.

The skilled person will be aware that various modifications to the above-identified embodiments can be made. For example, if other VoIP-capable networks become available, an approach according to the present invention may be implemented in order to inform the core network that the UE moves between a non-VoIP capable area to a VoIP-capable area and vice versa.

Although one aspect of the system described herein involves deactivating or ignoring ISR, embodiments of the may also operate when ISR is not activated. In such cases, the UE 5 sends a Routing Area Update Request message or Tracking Area Update Request message in response to determining that the VoIP capability of the base station with which it has just registered is different from the VoIP capability of the base station with which it was previously registered.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method of operating a mobile station, comprising:
   registering the mobile station with a first base station of a plurality of base stations provided within at least one radio network, wherein only some of the plurality of base stations support a Voice over Internet Protocol (VoIP) service;
   activating Idle mode Signalling Reduction (ISR) functionality at the mobile station following the step of registering the mobile station with the first base station, such that the mobile station is configured to send a Routing Area Update Request message or a Tracking Area Update Request message to any one of the plurality of base stations only under a set of predetermined conditions, the set of predetermined conditions being independent of the functionality of any of the plurality of base stations to support VoIP;
   after activating the ISR functionality at the mobile station, deciding to move communications service for the mobile station to a second base station of the plurality of base stations;
   after activating the ISR functionality at the mobile station, determining at the mobile station that one of the first base station and the second base station has functionality to support VoIP and the other does not; and
   sending a Routing Area Update Request message or Tracking Area Update Request message from the mobile station to the second base station in response to said determination regarding functionality to support VoIP.

2. The method of claim 1, further comprising:
   deactivating the ISR functionality at the mobile station in response to said determination regarding functionality to support VoIP.

3. The method of claim 1, wherein the step of determining regarding functionality to support VoIP comprises receiving a communication at the mobile station from a Device Management server.

4. The method of claim 1, wherein the step of determining regarding functionality to support VoIP comprises:
   sending a Routing Area Update Request message or Tracking Area Update Request message to the first base station; and
   receiving a Routing Area Update Accept message or Tracking Area Update Accept message from the first base station, indicating that one of the first base station and the second base station has functionality to support VoIP and the other does not.

5. The method of claim 1, wherein the first base station is a part of a first radio network having a first radio access technology and the second base station is a part of a second radio network having a second, different radio access technology.

6. The method of claim 1, wherein the mobile station is registered with an IP Multimedia Subsystem (IMS) for voice and wherein the first base station or second base station is part of a Registration Area that supports VoIP using an IMS voice over a packet switched session.

7. A non-transitory computer readable medium storing a computer program operable when operated using a processor to carry out the method of claim 1.

8. A method of operating a radio network, comprising:
   operating a mobile station by:
      registering the mobile station with a first base station of a plurality of base stations provided within the radio network,
      activating Idle mode Signalling Reduction (ISR) functionality at the mobile station following the step of registering the mobile station with the first base station, such that the mobile station is configured to send a Routing Area Update Request message or a Tracking Area Update Request message to any one of the plurality of base stations only under a set of predetermined conditions, the set of predetermined conditions being independent of the functionality of any of the plurality of base stations to support a Voice over Internet Protocol (VoIP),
      after activating the ISR functionality at the mobile station, deciding to move communications service for the mobile station to a second base station of the plurality of base stations,
      after activating the ISR functionality at the mobile station, determining at the mobile station that one of the first base station and the second base station has functionality to support VoIP and the other does not, and
      sending a Routing Area Update Request message or Tracking Area Update Request message from the mobile station to the second base station in response to said determination regarding functionality to support VoIP;

receiving the Routing Area Update Request message or Tracking Area Update Request message sent by the mobile station at a Serving GPRS Support Node (SGSN) or Mobility Management Entity (MME) of the radio network;

communicating from the SGSN or MME to a Gateway GPRS Support Node (GGSN) or Serving-Gateway (S-GW) and Packet Data Network-Gateway (P-GW) a message to update the Packet Data Protocol (PDP) context in response to the received Routing Area Update Request message or Tracking Area Update Request message;

communicating an acknowledgment message from the GGSN or S-GW and P-GW to the SGSN or MME in response to the message to update the PDP context; and communicating a Routing Area Update Accept message or Tracking Area Update Accept message from the SGSN or MME to the mobile station.

9. A non-transitory computer readable medium storing a computer program operable when operated using a processor to carry out the method of claim 8.

10. A mobile station, comprising:
a transceiver arranged to communicate with at least one radio network having a plurality of base stations, wherein only some of the plurality of base stations support a Voice over Internet Protocol (VoIP) service; and
a processor configured to:
control the transceiver to register the mobile station with a first base station from the plurality of base stations;
activate Idle mode Signalling Reduction (ISR) functionality at the mobile station following registration with the first base station, such that a Routing Area Update Request message or a Tracking Area Update Request message is sent by the transceiver to any one of the plurality of base stations only under a set of predetermined conditions, the set of predetermined conditions being independent of the functionality of any of the plurality of base stations to support VoIP;
decide, after activating the ISR functionality at the mobile station, to move communications service for the mobile station to a second base station;
determine, after activating the ISR functionality at the mobile station, that one of the first base station and the second base station has functionality to support VoIP and the other does not; and
control the transceiver to send a Routing Area Update Request message or Tracking Area Update Request message to the second base station in response to said determination regarding functionality to support VoIP.

11. The mobile station of claim 10, wherein the processor is further configured to deactivate the ISR functionality in response to said determination regarding functionality to support VoIP.

12. The mobile station of claim 10, wherein the processor is configured to make a determination regarding functionality to support VoIP by: controlling the transceiver to send a Routing Area Update Request message or Tracking Area Update Request message to the first base station; and controlling the transceiver to receive a Routing Area Update Accept message or Tracking Area Update Accept message from the first base station, indicating that one of the first base station and the second base station has functionality to support VoIP and the other does not.

13. The mobile station of claim 10, wherein the transceiver is configured to operate with a plurality of radio networks, each radio network have a respective radio access technology.

14. The mobile station of claim 10, wherein the processor is further configured to register the mobile station with an IP Multimedia Subsystem (IMS) for voice and wherein the mobile station is further configured to communicate with a base station that is part of a Registration Area that supports VoIP using an IMS voice over a packet switched session.

* * * * *